us 010615407B2

United States Patent
Li et al.

(10) Patent No.: US 10,615,407 B2
(45) Date of Patent: Apr. 7, 2020

(54) NA—FECL$_2$ ZEBRA TYPE BATTERY

(71) Applicant: Battelle Memorial Institute, Richland, WA (US)

(72) Inventors: Guosheng Li, Richland, WA (US); Jin Yong Kim, Richland, WA (US); Xiaochuan Lu, Richland, WA (US); Kerry D. Meinhardt, Kennewick, WA (US); Vincent L. Sprenkle, Richland, WA (US)

(73) Assignee: Battelle Memorial Institute, Richland, WA (US)

( * ) Notice: Subject to any disclaimer, the term of this patent is extended or adjusted under 35 U.S.C. 154(b) by 0 days.

(21) Appl. No.: 14/460,266

(22) Filed: Aug. 14, 2014

(65) Prior Publication Data
US 2016/0049641 A1 Feb. 18, 2016

(51) Int. Cl.
H01M 4/136 (2010.01)
H01M 4/134 (2010.01)
H01M 10/39 (2006.01)
H01M 4/62 (2006.01)
H01M 4/38 (2006.01)
H01M 4/58 (2010.01)

(52) U.S. Cl.
CPC .......... *H01M 4/136* (2013.01); *H01M 4/134* (2013.01); *H01M 4/38* (2013.01); *H01M 4/62* (2013.01); *H01M 10/399* (2013.01); *H01M 4/381* (2013.01); *H01M 4/582* (2013.01)

(58) Field of Classification Search
None
See application file for complete search history.

(56) References Cited

U.S. PATENT DOCUMENTS

| | | | |
|---|---|---|---|
| 4,592,969 A | 6/1986 | Coetzer et al. | |
| 5,283,135 A | 2/1994 | Redey et al. | |
| 5,536,593 A | 7/1996 | Redey et al. | |
| 5,573,873 A | 11/1996 | Bugga et al. | |
| 8,178,231 B2 * | 5/2012 | Soloveichik | H01M 4/0471 252/182.1 |
| 8,329,336 B2 * | 12/2012 | Soloveichik | H01M 10/26 252/182.1 |
| 8,343,661 B2 | 1/2013 | Galloway et al. | |
| 8,435,673 B2 * | 5/2013 | Lemmon | H01M 4/38 429/209 |
| 8,697,279 B2 * | 4/2014 | Kniajanski | H01M 2/1646 429/103 |
| 8,962,191 B2 * | 2/2015 | Valiance | H01M 4/661 29/623.1 |
| 2011/0070496 A1 | 3/2011 | Soloveichik et al. | |
| 2011/0104570 A1 * | 5/2011 | Galloway | H01M 4/134 429/221 |

(Continued)

OTHER PUBLICATIONS https://en.wikipedia.org/wiki/Polysulfide. Printout for Polysulfide from Wikipedia. No date.*

(Continued)

*Primary Examiner* — Tracy M Dove
(74) *Attorney, Agent, or Firm* — Klarquist Sparkman, LLP

(57) ABSTRACT

An energy storage device comprising a cathode comprising:
(i) an Fe source;
(ii) at least one sulfur species
and (iii) NaCl,
wherein the mol percent of S is less than 10, based on the total moles of (i), (ii) and (iii).

6 Claims, 3 Drawing Sheets

(56) References Cited

U.S. PATENT DOCUMENTS

2013/0196209 A1    8/2013  Hart et al.
2013/0196224 A1    8/2013  Kim et al.
2014/0023902 A1    1/2014  Lu et al.
2014/0023903 A1    1/2014  Lu et al.
2014/0038038 A1    2/2014  Vallance et al.

OTHER PUBLICATIONS

International Search Report issued in international application No. PCT/US2015/035419 dated Sep. 24, 2015, 3 pages.
Sudoh et al., "Mathematical Modeling of the Sodium/Iron Chloride Battery," *J. Electrochem. Soc.*, 137(3): 876-883, Mar. 3, 1990.
Bones et al., "A Sodium/Iron (II) Chloride Cell with a Beta Alumina Electrolyte," *Journal of the Electrochemical Society*, 134(10): 2379-2382, Oct. 1987.
European Search Report issued for EPC Application No. 15831625.7 dated Mar. 26, 2018.
Li et al., "An Advanced Na—FeCl 2 ZEBRA Battery for Stationary Energy Storage Application," *Advanced Energy Materials*, 5(12): 7 pages, 2015.

\* cited by examiner

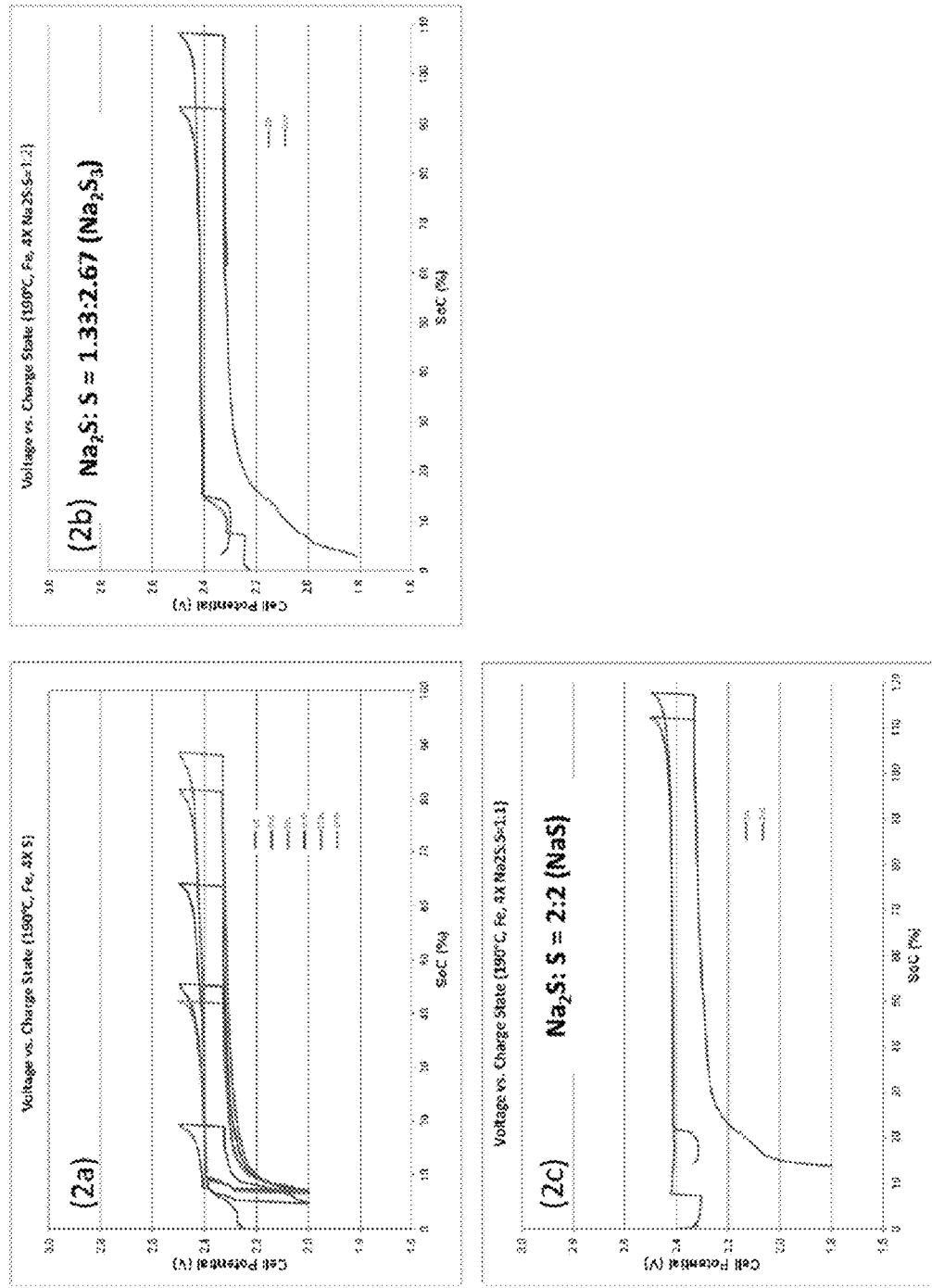
FIG. 2a-c

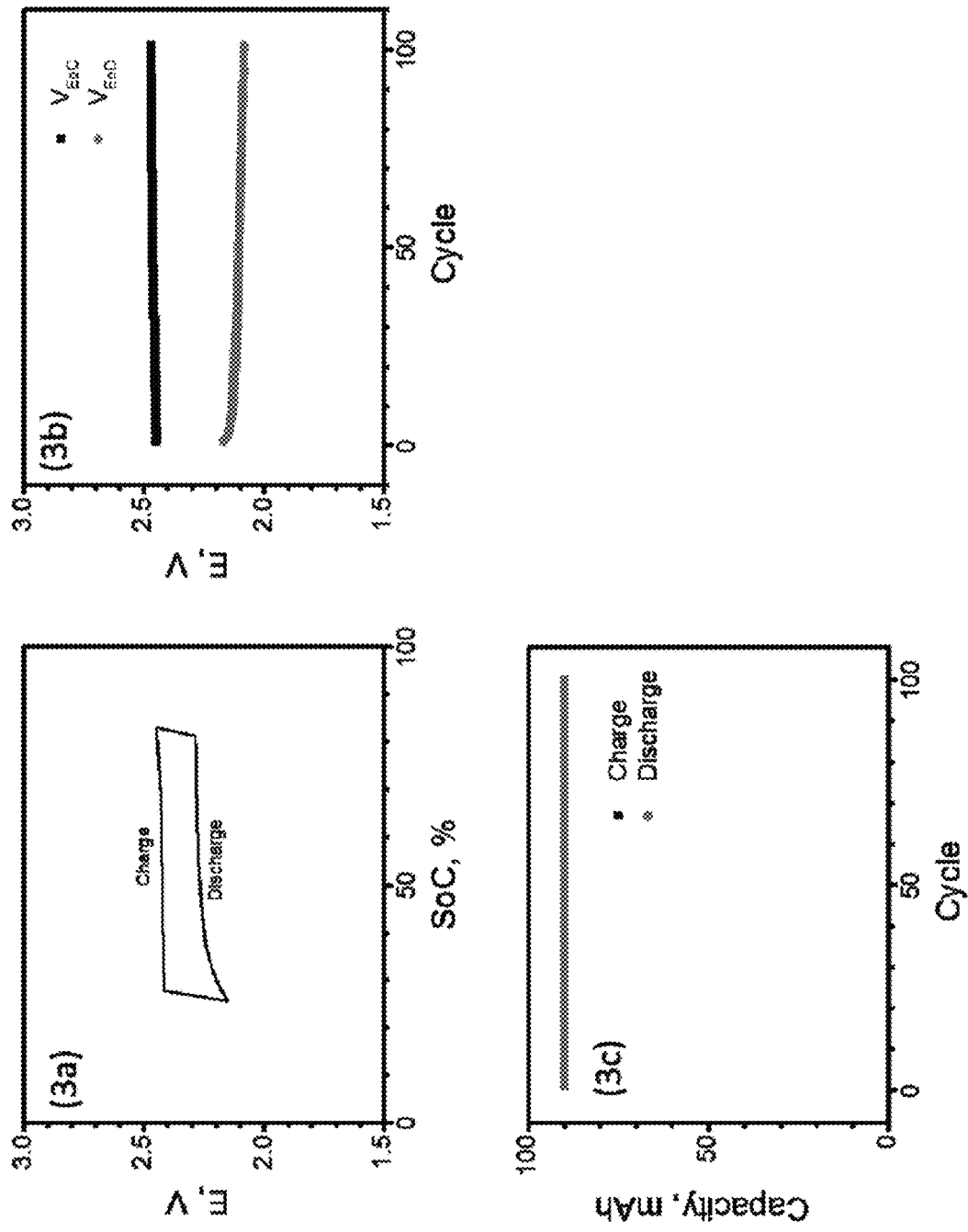
FIG. 3a-c

NA—FECL$_2$ ZEBRA TYPE BATTERY

ACKNOWLEDGMENT OF GOVERNMENT SUPPORT

This invention was made with Government support under Contract DE-AC05-76RL01830 awarded by the U.S. Department of Energy. The Government has certain rights in the invention.

BACKGROUND

Electrochemical cells are known (referred to as "ZEBRA" cells) which include a molten alkali metal anode; an electrically insulative solid separator that functions as an alkali metal ion-conducting solid electrolyte; a salt electrolyte (referred to herein as a "catholyte") in a cathode compartment which is at least partially molten at the operating temperature of the cell; and a cathode. Electrochemical cells of this type are useful as energy storage devices, particularly when a plurality of cells are arranged to form a module or battery pack.

Commonly used cells employ NiCl$_2$ as the active material in the cathode. However, Ni is expensive and such batteries have a high operating temperature (~350° C.). The use of FeCl$_2$ as the active material in the cathode has been proposed, but it has not been considered for commercialization due to technical hurdles in raw material handling during fabrication of the cell. For example, a Na/NiCl$_2$ battery can be assembled in the discharged state, which only requires handling of NaCl and Ni powder. However, a Na/FeCl$_2$ battery requires assembly in the charged state means handling highly pyrophoric Na metal and FeCl$_2$. In addition, the FeCl$_2$ used for making the cathode is obtained by chlorinating Fe powder under a chlorine environment. A main reason for using chlorinated FeCl$_2$ to make the cathode is that the surface electrochemical activities of Fe powder are blocked by passivation layers (e.g., various iron oxide and hydroxide species).

SUMMARY

Disclosed herein is an energy storage device comprising a cathode comprising:
(i) an Fe source;
(ii) at least one sulfur species
and (iii) NaCl,
wherein the mol percent of S is less than 10, based on the total moles of (i), (ii) and (iii).

Also disclosed herein is a method comprising assembling an electrochemical cell in a discharge state, the method including:
mixing together (i) an Fe source, (ii) (a) elemental sulfur and a sulfur agent or (ii) (b) polysulfide, and (iii) NaCl;
forming the resulting mixture into a cathode for an electrochemical cell;
introducing a catholyte into the cathode; and
coupling anode and electrolyte components with the cathode.

Further disclosed herein is a method comprising forming a cathode composition from (i) an Fe source, (ii) (a) elemental sulfur and a sulfur agent or (b) a polysulfide, and (iii) NaCl, wherein the mol percent of S is less 10, based on the total moles of (i), (ii) and (iii).

The foregoing will become more apparent from the following detailed description, which proceeds with reference to the accompanying figures.

BRIEF DESCRIPTION OF THE DRAWINGS

FIGS. 2(a)-(c) are graphs showing the battery activation process (maiden cycle) with different sulfur agents added into the cathode composition.

FIGS. 3(a)-(c) are representations of battery performance.

DETAILED DESCRIPTION

Figure 1:
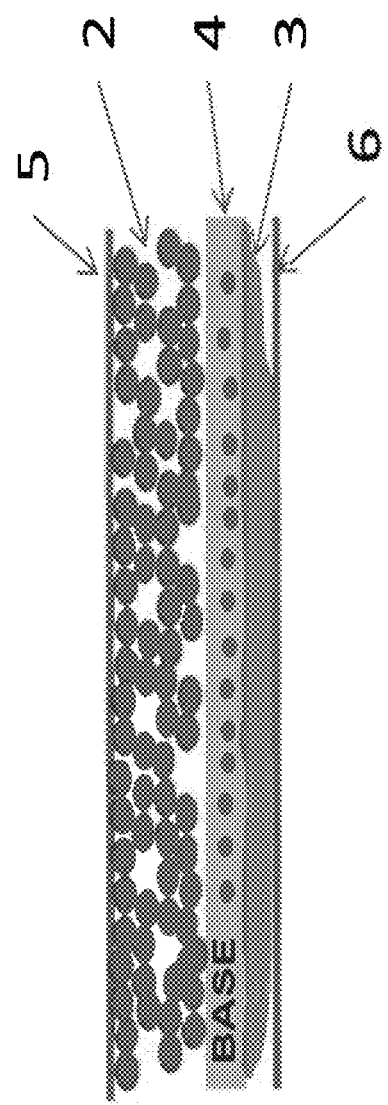
FIG. 1 is a schematic view of a rechargeable molten alkali metal battery.

Disclosed herein is an electrochemical cell (shown in FIG. 1) for rechargeable molten alkali metal batteries that includes a cathode 2, an anode 3, and a beta-alumina solid electrolyte 4 separating the anode 3 and the cathode 2. The cathode 2 is typically made from a porous material into which a catholyte is introduced or infiltrated. A positive current collector 5 is in electrical contact with the cathode 2 and a negative current collector 6 is in electrical contact with the anode 3.

Disclosed herein is enabling technology for using iron (Fe) salts in the cathode of molten alkali metal batteries. Removal of the passivation layer on Fe powder particle surface is required for assembling molten alkali metal batteries with FeCl$_2$ as the active electrochemical component in the discharge state. However, the passivation layer must be removed without interfering with the electrochemistry of the electrochemical cell. It has been found that utilizing at least one sulfur species as a component of the cathode assembly mixture removes at least a portion of the passivation layer, preferably substantially all of the layer, and remarkably activates the Fe powder particle surface and enables battery operating temperatures as low as 190° C. For example, Na/FeCl$_2$ batteries (2.35V) as disclosed herein can operate at approximately 190° C. with 90% of the energy density of conventional Na/NiCl$_2$ batteries (2.8 V) operated at 320° C. Lower operating temperatures also present the opportunity of using polymeric construction materials for the battery and seals. Adding small amounts of at least one sulfur species to a cathode assembly mixture that includes Fe also enables preparation of the cells in a "cold" (i.e., discharged) state, thus lowering costs (Fe is less expensive than Ni used in commercial NiCl$_2$ ZEBRA batteries) and improving assembly safety.

The electrochemical cell fabrication disclosed herein involves assembling the cell at a low temperature in the discharge state thereby avoiding handling molten alkali metal. The cathode components can be mixed together at room temperature (e.g., 20-25° C.). In general, the cathode components include a (i) Fe source, (ii) at least one sulfur species, and (iii) NaCl powder. In certain embodiments, the sulfur species is present in an amount of less than 10 mol %, more particularly less than 6 mol %, based on the total amount of (i), (ii) and (iii). In certain embodiments, the Fe/NaCl molar ratio is less than two. In certain embodiments, solids forms of each of ingredients (i), (ii), and (iii) are mixed together at room temperature. For example, an Fe source, elemental sulfur, a sulfur agent, and NaCl are mixed together. In another example, an Fe source, a polysulfide, and NaCl are mixed together.

In certain embodiments, the cathode mixture has a fixed Fe/NaCl molar ratio of 0.5 to 10. In certain embodiments, the cathode mixture has a Fe/NaCl molar ratio of 1.8 at the beginning of the battery cycle. The Fe/NaCl molar ratio changes during the battery cycle. For example, the ratio of 1.8 will change to 10 at 80% SOC.

The amount of sulfur species in the cathode admixture depends on the cell conditions. The amount of sulfur or polysulfide is sufficient to activate the Fe particle by removing at least a portion of the passivation layer, but is not so great as to interfere with the cell electrochemical reactions. In general, the molar percent of S (from the sulfur species) is generally at least 1 mol %, more particularly at least 2 mol %, and most particularly at least 4 mol %, but less than 10 mol %, more particularly less than 6 mol %, and most particularly 4 mol %, based on total cathode ingredients. In certain embodiments, the mole ratio of NaCl/Fe/S in the cathode mixture is 0.32:0.62:0.04.

The resulting cathode composition can then be mixed or infiltrated with the catholyte at a temperature above the melting point of the catholyte (e.g., 200° C. in the case of $NaAlCl_4$ as the catholyte). The weight ratio of $NaAlCl_4$ to the cathode ingredients (Fe, NaCl, sulfur species) is less than 1.0.

Illustrative sulfur species include elemental S, $Na_2S$, CuS, $Li_2S$, FeS, $K_2S$, ZnS, polysulfide, and any and all combinations thereof. Illustrative polysulfides include alkali metal polysulfides having a formula of $A_{2-x}S_y$, wherein A is selected from Li, Na, K, Rb, or Cs; $0 \leq x \leq 2$; $2 \leq y \leq 8$. In certain embodiments, y is greater than 2. In certain embodiments, the polysulfide can be generated in situ during the cell fabrication process by mixing together elemental S and at least one other sulfur agent (e.g., $Na_2S$) in forming the cathode. In another variant, a pre-made polysulfide can be added into the cathode mixture. In certain specific embodiments, the sulfur component is provided by a mixture of $Na_2S$ and elemental S. Although not bound by any theory, it is believed that the $Na_2S$ and S mixture results in the formation of a polysulfide under the conditions of fabricating cell. The mol ratio of $Na_2S/S$ may range from 1:1 to 1:7. For example, a $Na_2S/S$ ratio of 1:1 will form $Na_2S_2$ and a $Na_2S/S$ ratio of 1:2 will form $Na_2S_3$.

Illustrative Fe sources include Fe powder. Prior to mixing into the cathode mixture the Fe powder particles' surfaces include a passivation layer comprising iron oxide(s) and/or iron hydroxide(s). In certain embodiments, the average particle size of the Fe particles is less than 10, more particularly less than 5, µm.

The catholyte is a sodium salt that is molten at the operating temperature of the energy storage device. The salt is not necessarily always molten. For example, if the energy storage device is cooled when not operating, the sodium salt can solidify. Examples of molten sodium salts can include, but are not limited to, sodium polysulfides, sodium metal halides, and combinations thereof. In a preferred embodiment, the molten sodium salt comprises $NaAlCl_4$. Other catholytes include, for example, $NaAlEtCl_3$ (Et is Ethyl), $NaAlBr_xCl_y$ (x+y=4), and $NaAlCl_xI_y$ (x+y=4).

The solid electrolyte may be a conductor of sodium ions, and typically is made from beta"-alumina. Further electrolytes include NASICON materials, such as $Na_{1+x}Zr_2Si_xP_{3-x}O_{12}$, wherein $0<x<3$.

The anode is a metallic alkali metal, typically metallic sodium. The anode material may be molten during use of the battery. In certain embodiments, Al powder may also be included in the anode.

The electrochemical cell disclosed herein operates based on the following overall electrochemical reaction:

2NaCl+Fe ↔ 2Na+FeCl$_2$, E=2.38 V at 190° C.

In one embodiment, the operating temperature of the energy storage devices described herein can be below 400° C. Preferably, the operating temperature is below 300° C. Most preferably, the operating temperature is below 200° C.

In certain embodiments, the electrochemical button cell has a total capacity of about 160 mAh/g, and a specific energy density of about 0.38 Wh/g.

In certain embodiments, the electrochemical cell is configured to exchange electrical energy with an external device. For example, the external device may be an energy source or an energy load.

In accordance with other embodiments, a battery includes two or more electrochemical cells as disclosed herein. In other embodiments, a system includes a plurality of batteries, electrically connected in series. Alternatively, the system may include a plurality of those batteries electrically connected in parallel, or, a plurality of the batteries electrically connected in series and in parallel.

In other embodiments, a method stores electrical energy transferred from an external circuit. The electrochemical cell is configured to connect with the external circuit. The external circuit is electrically connected to a negative pole and a positive pole of electrochemical cell.

In other embodiments, a method releases electrical energy from the electrochemical cell to an external circuit. The electrochemical cell is configured to connect sequentially with external circuits. The external circuits are electrically connected to a negative pole and a positive pole of electrochemical cell.

In other embodiments, another method stores electrical energy transferred from an external circuit.

In some embodiments, the electrochemical cell, or batteries or modules comprising the cell, is connected to one or more of an electric power plant, a power transmission line, or an external circuit that delivers energy converted from a renewable energy source.

EXAMPLES

Cathode materials used in this example consist of Fe powder (Alfa Aesar, 99.9%, <10 um), NaCl (Alfa Aesar, 99.99%), and a small amount of least one sulfur species. First, the cathode materials (Fe, NaCl, and the at least one sulfur species were thoroughly mixed using a low-energy ball milling method. The relative amount of Fe/NaCl/sulfur agent species was 0.33:0.61:0.06 on a mol % basis. The $Na_2S/S$ ratio was 1:1 or 2:1. Sodium tetrachloroaluminate ($NaAlCl_4$) catholyte, was prepared following the procedure reported in Li et al, Journal of Power Sources, 220, 193 (2012). A molar ratio of Na to Al in the catholyte analyzed by ICP was 0.51:0.49. An excess of NaCl was used to prevent the formation of Lewis-acidic melts.

For the typical button cells, ~1 g of granules (mixture of Fe, NaCl and sulfur species) were loaded on the cathode side and then 0.5 g of catholyte was vacuum infiltrated at 200° C. The theoretical capacity for 1 g of granules with a molar ratio of Fe/NaCl=1.82 is 160 mAh, which is calculated from the capacity of NaCl.

FIGS. 2(a)-(c) are graphs showing the battery activation process (maiden cycle) with different sulfur agents added into cathode composition. 1× shown in the Figures is equivalent to 1 mol % of total battery cathode composition. The battery with 4× sulfur(S) in the cathode, FIG. (a), shows a steady growth for cycling capacity over cycles, and requires a number of full cycles to reach the full capacity at 190° C. In contrast to 4× S, the capacities of the batteries containing mixed $Na_2S/S$ in the cathode increase drastically and reach the full capacity at the second cycle, as shown in FIG. (b)

and (c). The batteries with Na$_2$S and CuS alone (i.e., without elemental S) in the cathode were not able to be cycled at 190° C.

The batteries having Na$_2$S/S (1:1, total 4×) in the cathode were tested under a fixed-capacity cycling test after the battery reached the full capacity during maiden cycles. The cycling capacity for each cell is fixed at 90 mAh, which is 25-83% SoC considering 157 mAh as the theoretical capacity for each cell. A typical voltage profile for charge and discharge process is shown in FIG. 3 (a). The battery was charged at a constant current of 20 mA (C/4.5) and was discharged at a constant powder (25 mW/cm$^2$, C/3). Voltages for the end of charge (EoC) and end of discharge (EoD) are shown in FIG. 3(b). Stable $V_{EoC}$ and $V_{EoD}$ present the superior stability of the battery. No capacity degradation was observed over 100 cycles as shown in FIG. 3(c).

In view of the many possible embodiments to which the principles of the disclosed invention may be applied, it should be recognized that the illustrated embodiments are only preferred examples of the invention and should not be taken as limiting the scope of the invention.

What is claimed is:

1. A method comprising assembling a Na/FeCl$_2$ battery in a discharge state, the method including:
   simultaneously mixing together (i) Fe powder, (ii) elemental sulfur and Na$_2$S, and (iii) NaCl, wherein (ii) is present in an amount of less than 10 mol percent S, based on the total moles of (i), (ii) and (iii), and wherein prior to mixing with the elemental sulfur, Na$_2$S and NaCl, the Fe powder comprises particles having a passivation layer, and mixing the Fe powder with the elemental sulfur, Na$_2$S and NaCl removes at least a portion of the passivation layer;
   forming the resulting mixture into a cathode, wherein the cathode does not include Ni;
   introducing a catholyte into the cathode; and
   coupling anode and electrolyte components with the cathode to form the Na/FeCl$_2$ battery.

2. The method of claim 1, wherein the mixing is performed at room temperature.

3. The method of claim 1, wherein the Fe source (i) to NaCl(iii) has a mol % ratio of 0.5:1 to 2:1.

4. The method of claim 3, wherein the Fe powder particles have an average particle size of less than 10 μm.

5. The method of claim 1, wherein the of Na$_2$S/S has a mol % ratio of 1:1 to 1:7.

6. A method comprising assembling an electrochemical cell a Na/FeCl$_2$ battery in a discharge state, the method including:
   simultaneously mixing together (i) Fe powder, (ii) Na$_2$S$_3$, and (iii) NaCl, wherein (ii) is present in an amount of less than 10 mol percent S, based on the total moles of (i), (ii) and (iii), and wherein prior to mixing with the Na$_2$S$_3$ and NaCl, the Fe powder comprises particles having a passivation layer, and mixing the Fe powder with the Na$_2$S$_3$ and NaCl removes at least a portion of the passivation layer;
   forming the resulting mixture into a cathode, wherein the cathode does not include Ni;
   introducing a catholyte into the cathode; and
   coupling anode and electrolyte components with the cathode to form the Na/FeCl$_2$ battery.

* * * * *